United States Patent
Hung

(10) Patent No.: US 6,345,810 B1
(45) Date of Patent: Feb. 12, 2002

(54) AERATING UNIT

(76) Inventor: Shen-Jan Hung, 3F, No. 77, Min-Chuan Rd., Hsin-Tien City, Taipei Hsien (TW)

( * ) Notice: Subject to any disclaimer, the term of this patent is extended or adjusted under 35 U.S.C. 154(b) by 0 days.

(21) Appl. No.: 09/506,826

(22) Filed: Feb. 18, 2000

(30) Foreign Application Priority Data

Jun. 17, 1999 (TW) .......................................... 88210085

(51) Int. Cl.[7] ................................................ B01F 3/04
(52) U.S. Cl. .......................................... 261/91; 261/93
(58) Field of Search ................... 261/84, 91, 93

(56) References Cited

U.S. PATENT DOCUMENTS

| 2,077,445 A | * | 4/1937 | Wallace et al. ............... 261/93 |
| 2,130,402 A | * | 9/1938 | Textor .......................... 261/93 |
| 3,385,576 A | * | 5/1968 | Wikswo ....................... 261/93 |
| 3,814,395 A | * | 6/1974 | Kaelin ......................... 261/93 |
| 4,066,722 A | * | 1/1978 | Pietruszewski et al. ....... 261/93 |
| 4,259,267 A | * | 3/1981 | Wang .......................... 261/93 |
| 4,290,885 A | * | 9/1981 | Kwak .......................... 261/93 |
| 4,350,648 A | * | 9/1982 | Watkins, III et al. ......... 261/91 |
| 4,358,413 A | * | 11/1982 | Brucker ....................... 261/91 |
| 4,734,235 A | * | 3/1988 | Holyoak ....................... 261/91 |
| 6,050,550 A | * | 4/2000 | Burgess ....................... 261/91 |

FOREIGN PATENT DOCUMENTS

| JP | 59-92093 A | * | 5/1984 | .................. 261/93 |
| SU | 1238803 A1 | * | 6/1986 | .................. 261/93 |

* cited by examiner

Primary Examiner—C. Scott Bushey
(74) Attorney, Agent, or Firm—Townsend and Townsend and Crew LLP

(57) ABSTRACT

An aerating unit includes a container, a submersible motor disposed in the container and having a shaft which is provided with a propeller, an air conduit connected to an air supply at one end and extending into said container at the other end which defines an air outlet adjacent to and facing toward the propeller for introducing air toward the propeller, and a base disposed below and aligned vertically with the propeller in the container and having a curved surface which is convex in a direction toward the propeller for deflecting the air directed from the propeller in radial directions away from the curved surface.

4 Claims, 6 Drawing Sheets

AERATING UNIT

BACKGROUND OF THE INVENTION

1. Field of the Invention

This invention relates to an aerating unit, more particularly to an aerating unit for treating a body of waste water.

2. Description of the Related Art

Processes for aerobic biotreatment of municipal or industrial waste water or sewage had been well developed. The known processes involve a preliminary treatment which separates floating larger particles, organic solid suspensions, or oil from a body of waste water, an intermediate treatment which includes an aerating unit that provides oxygen to be dissolved in the body of waste water for allowing active sludge to decompose aerobically organic compounds dissolved in the body of waste water, and a final treatment which includes a sedimentation apparatus for precipitating solid particles to separate the treated waste water from the precipitates. The aerating unit is normally designed to provide fine air bubbles dispersed in the body of waste water so as to replenish continually the waste water with dissolved oxygen to enhance the aerobic biotreatment. The retention time and the size of the air bubbles generated by the aerating unit are very important factors to ensure effective dissolution of the oxygen in the waste water.

FIG. 1 illustrates a conventional aerating unit which includes a plurality of disk-shaped diffusers 14 mounted in a container 1 which contains a body of waste water. The diffusers 14 are connected to an air blower 12 via a pipeline 11. Each diffuser 14 is formed with a plurality of small apertures for generating air bubbles dispersed in the body of waste water when the air blower 12 is activated. Since the air bubbles thus formed rise straightly by virtue of buoyancy, the air bubbles generated by each diffuser 14 in the body of waste water are dispersed within a relatively narrow area, and the retention time of the air bubbles is relatively short, thereby necessitating the use of many diffusers 14 in the container 1.

FIG. 2 illustrates another conventional aerating unit which is similar to the above described aerating unit except that an agitating device 26 is mounted in a container 2 above a plurality of diffusers 25. The agitating device 26 pushes waste water downwardly to mix with rising air bubbles generated by the diffusers 25, and provides turbulence in the body of waste water so as to enhance the dispersion of the air bubbles when the agitating device 26 is actuated. While the dispersion of the air bubbles in the body of waste water can be enhanced by utilizing the agitating device 26, the dispersion of the air bubbles in the body of waste water is still unsatisfactory. Moreover, the diffusers 25 are normally spaced apart by a relatively long distance from the bottom of the container 2, thereby decreasing the retention time of the air bubbles.

FIG. 3 illustrates yet another conventional aerating unit 3 which includes a submersible motor 31 immersed in a body of waste water, an air housing 33 connected to the motor 31 and extending downwardly therefrom, an air conduit 34 connected to the air housing 33 and extending upwardly therefrom and through the surface of the waste water, and a diffuser 36 connected to the air housing 33 and extending downwardly therefrom. The diffuser 36 is formed with a plurality of openings 35. The submersible motor 31 has a shaft extending downwardly therefrom into the air housing 33. The shaft is provided with a propeller 32 within the air housing 33 for introducing air into the diffuser 36 from above the surface of the waste water via the air conduit 34 and the air housing 33, and for driving air out of the diffuser 36 to form fine air bubbles dispersed in the body of waste water when the shaft is rotated. The horsepower of the submersible motor 31 must be adequate to overcome a water head from the diffuser 36 to the surface of the waste water in order to suck atmospheric air into the air housing 33 and to drive the air out of the diffuser 36. However, the deeper the location of the aerating unit 3 in the body of waste water, the larger will be the horsepower requirement for the submersible motor 31 to ensure sufficient air flow into the body of waste water.

SUMMARY OF THE INVENTION

Therefore, it is an object of the present invention to provide an aerating unit that is capable of overcoming the aforementioned problems commonly associated with the prior arts.

Accordingly, an aerating unit of this invention is adapted to treat a body of waste water and comprises: a container adapted for storing the body of waste water; a submersible motor disposed in the container and having a shaft extending downwardly and outwardly therefrom into the body of waste water, the shaft having a bottom free end provided with a propeller; an air conduit adapted to be connected to an air supply at one end, and extending into the container at the other end which defines an air outlet adjacent to and facing toward the propeller, the air conduit being adapted to introduce air into the body of waste water stored in the container, thereby generating larger air bubbles inside the container that are directed toward the propeller, the motor being operable so as to enable the propeller to break the larger air bubbles into finer air bubbles that are directed downwardly; and a base disposed vertically below and aligned with the motor in the container, the base having a curved surface which is convex in a direction toward the propeller for deflecting the finer air bubbles directed from the propeller in radial directions of the curved surface in the body of waste water.

BRIEF DESCRIPTION OF THE DRAWINGS

In drawings which illustrate an embodiment of the invention.

DETAILED DESCRIPTION OF THE PREFERRED EMBODIMENT

Figure 1:
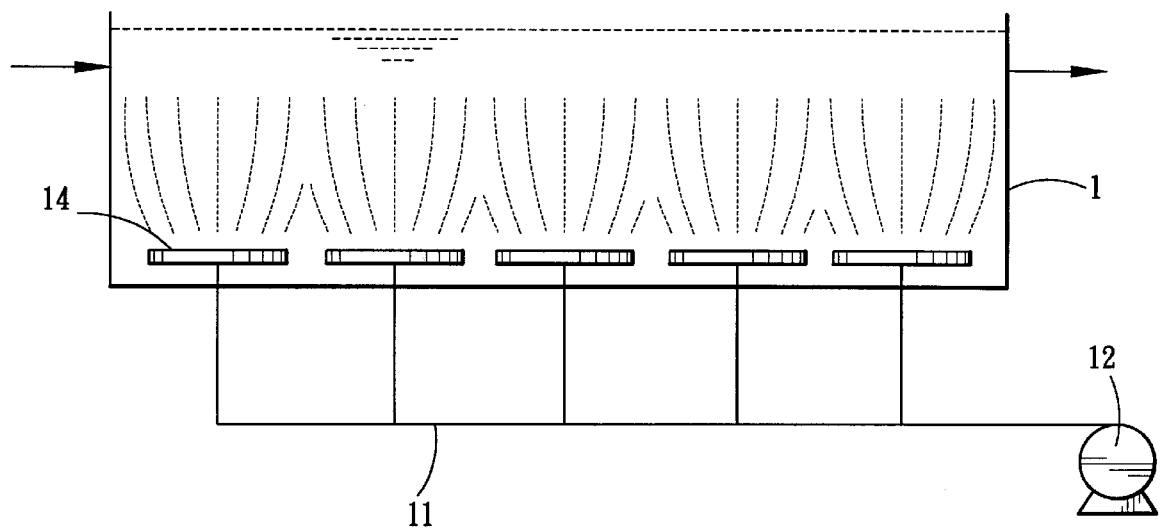
FIG. 1 is a schematic view of a conventional aerating unit.
Figure 2:
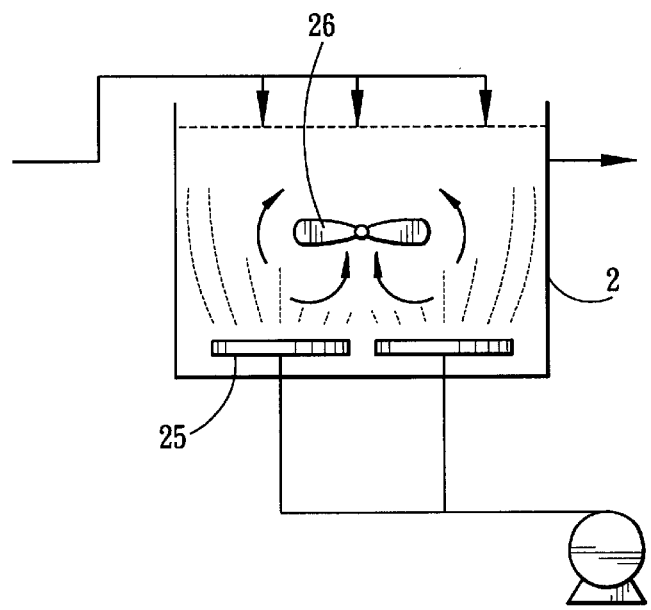
FIG. 2 is a schematic view of another conventional aerating unit.
Figure 3:
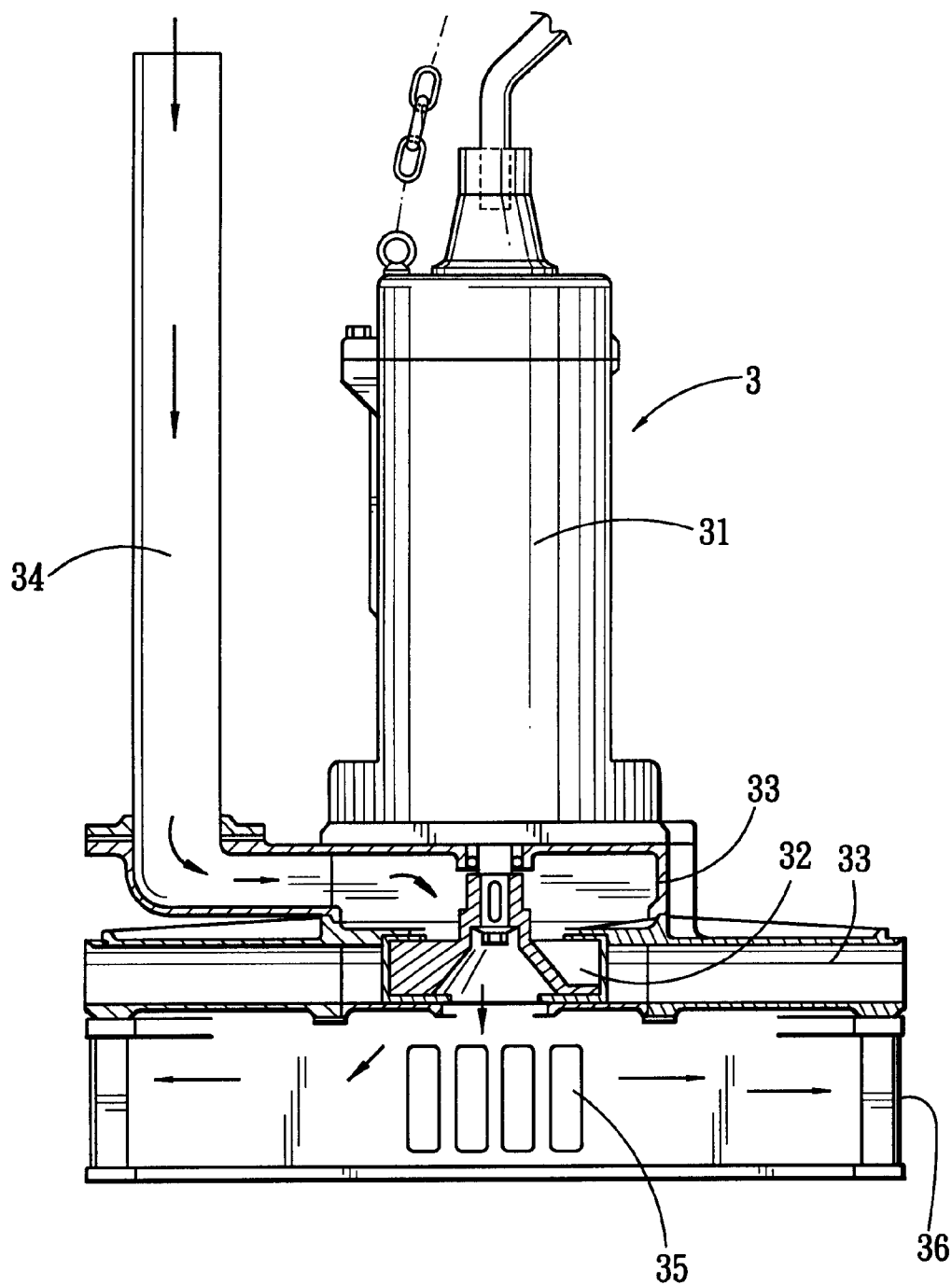
FIG. 3 is a schematic view of yet another conventional aerating unit.
Figure 4:
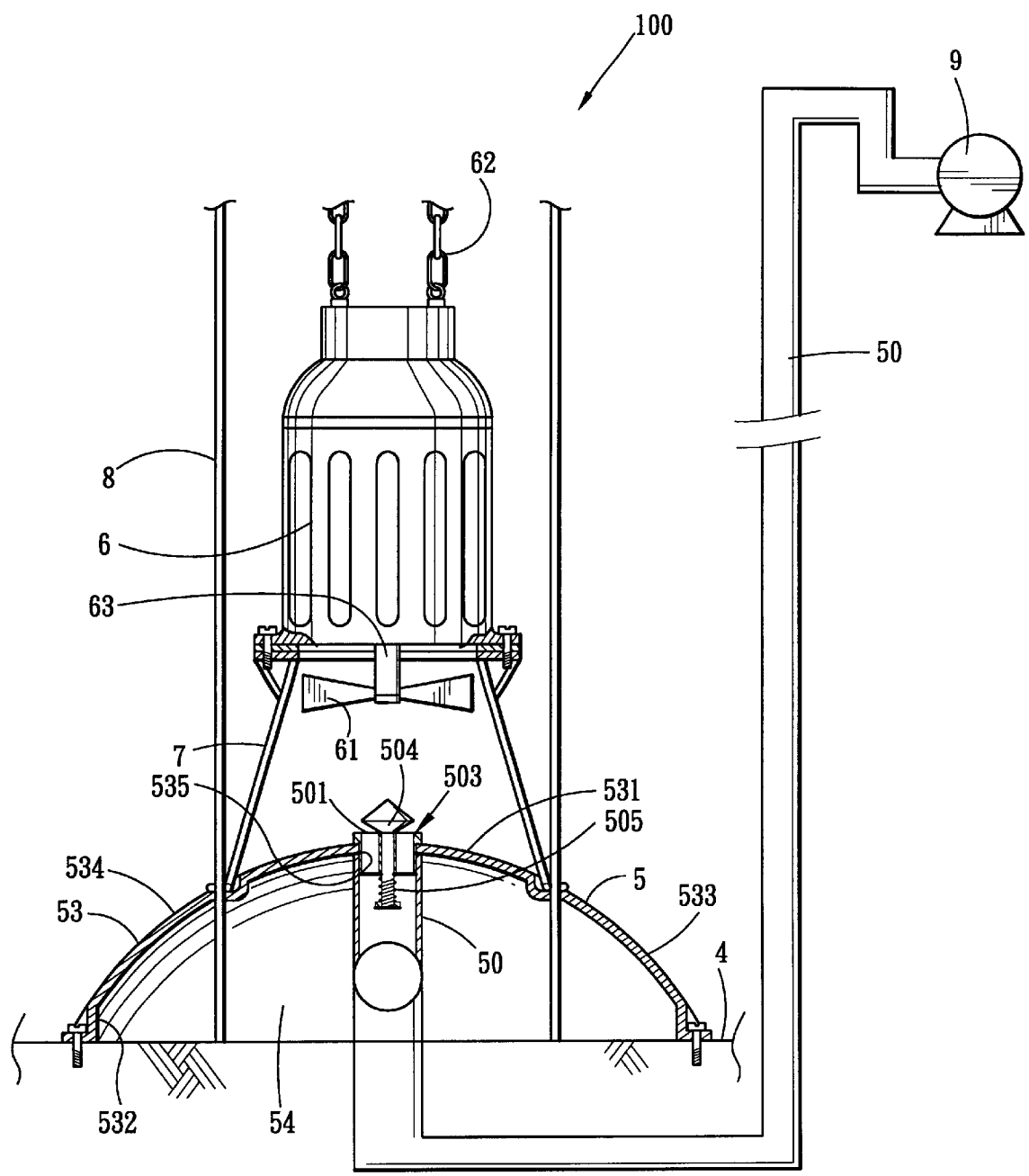
FIG. 4 is a partly cross-sectional schematic side view of an aerating unit embodying this invention.
Figure 5:
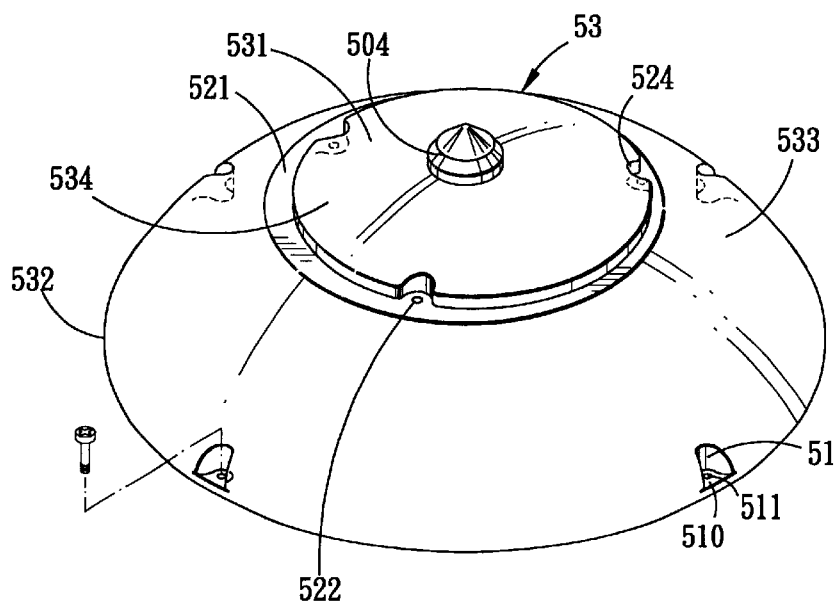
FIG. 5 is a perspective view of a base of the aerating unit of FIG. 4.
Figure 6:
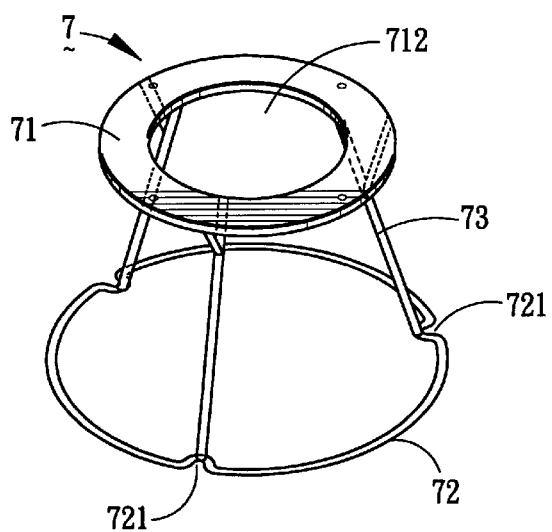
FIG. 6 is a perspective view of a rack of the aerating unit of FIG. 4.
Figure 7:
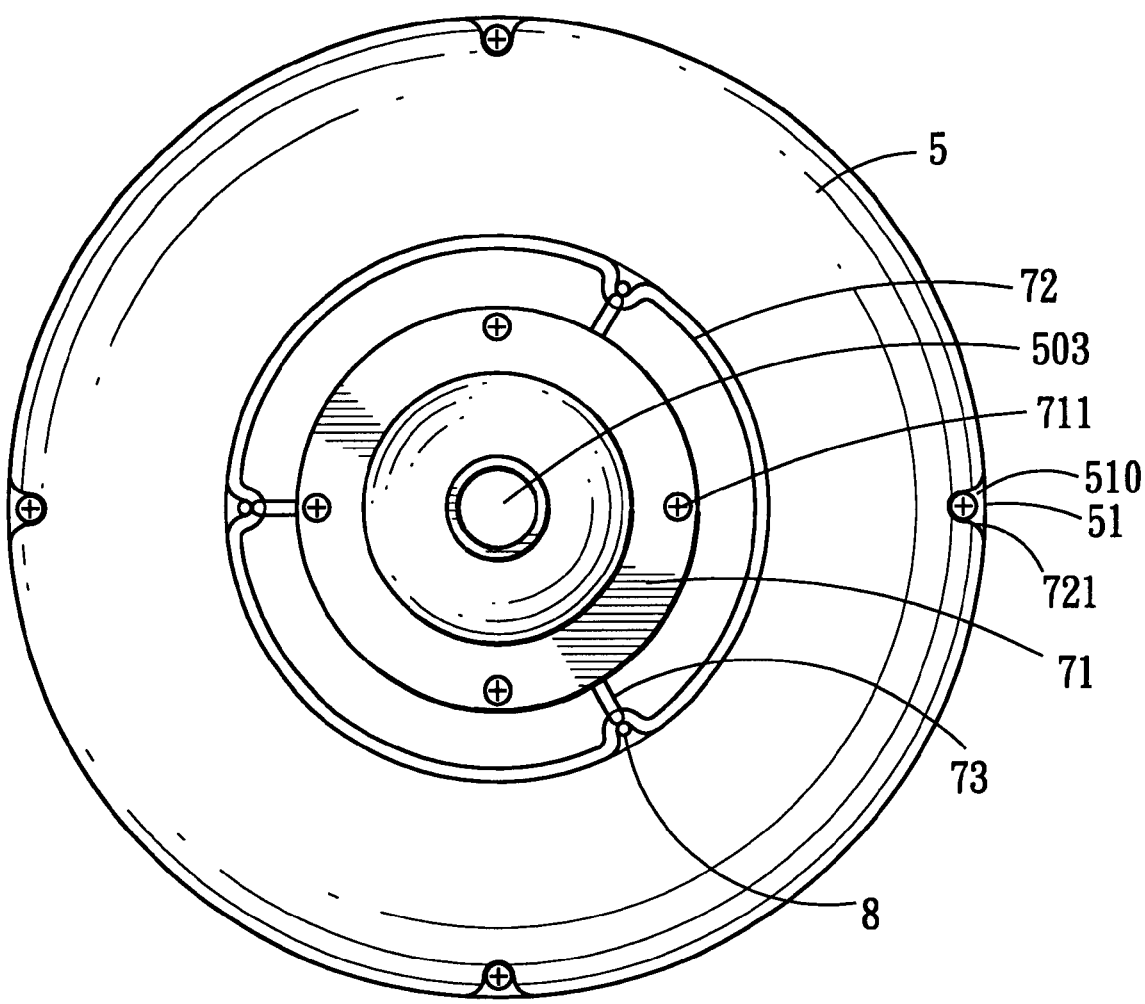
FIG. 7 is a fragmentary top view of the aerating unit of FIG. 4.

FIGS. 4 to 7 illustrate an aerating unit 100 embodying this invention. The aerating unit 100 includes a submersible motor 6 which is disposed in a body of waste water stored in a container 4, a base which has a curved shell body 53 and which is disposed below and aligned vertically with the submersible motor 6, a supporting rack 7 seated on the base 5 for supporting the submersible motor 6, and an air conduit 50 which is connected to an air blower 9 at one end and which extends into the shell body 53 at the other end that defines an air outlet 501. The air blower 9 is located externally of the container 4 and serves as an air supply.

The submersible motor 6 has a shaft 63 which extends downwardly and outwardly therefrom into the body of waste water, and which has a bottom free end that is provided with a propeller 61.

The shell body 53 has an apex 531 aligned with the shaft 63, a bottom peripheral end 532 opposite to the apex 531, and an intermediate region 533 extending circumferentially and downwardly from the apex 531 to the bottom peripheral end 532. The shell body 53 defines a curved surface 534 on a convex side adjacent to the propeller 61. The curved surface 534 is convex towards the propeller 61, and has a gradually increasing cross-section from the apex 531 to the bottom peripheral end 532. The shell body 53 further includes a bottom end flange 535 extending radially and outwardly from the bottom peripheral end 532 and mounted securely on the center of a bottom of the container 4. A top opening 535 is formed in the center of the apex 531 of the shell body 53, and is aligned with the shaft 63 of the motor 6.

The air conduit 50 extends from the air blower 9 into a chamber 54 confined by the shell body 53 and the bottom of the container 4, and further extends outwardly of the chamber 54 through the top opening 535 in the shell body 53. The air outlet 501 is positioned above and adjacent to the top opening 535 in the shell body 53, and faces toward the propeller 61. A check valve 503 is mounted in the air conduit 50 at the air outlet 501. The check valve 503 has a spring (not shown) mounted in the air conduit 50, and a headed plug having a rod portion 505 which is connected to the spring at one end and which extends upwardly therefrom. The headed plug further has a head portion 504 which is disposed above the air outlet 501 and which is connected to the rod portion 505 at the other end. The head portion 504 has a cone-shaped lower part for covering slidably the air outlet 501. The lower part of the head portion 504 is moved away from the air outlet 501 by air flow supplied by the air blower 9, and is urged to close the air outlet 501 by the spring when the air blower 9 is deactivated.

The supporting rack 7 has an annular upper plate 71 defining an opening 712, a lower ring 72 disposed below and aligned with the upper plate 71 and having a plurality of angularly spaced apart tongues 721 projecting inwardly thereof, and a plurality of legs 73 interconnecting the upper plate 71 and the tongues 721 of the lower ring 72. The intermediate region 533 of the shell body 53 has a plain annular shoulder face 521 formed thereon, and a plurality of angularly spaced apart grooves 524 extending inwardly thereof from the shoulder face 521. The lower ring 72 is seated on the shoulder face 521 with the tongues 721 engaging the grooves 524. The submersible motor 6 is seated and fastened on the upper plate 71 of the supporting rack 7 with the shaft 63 extending through the opening 712 in the upper plate 71 into a space between the upper plate 71 and the lower ring 72.

The aerating unit 100 further includes a plurality of elongated guide rods 8 mounted securely on the bottom of the container 4 within the chamber 54 and extending upwardly therefrom through through-holes 522 formed in the shoulder face 521 within the grooves 524. The guide rods 8 have top portions extending through the surface of the body of waste water. The arrangement of the guide rods 8 is advantageous in that the submersible motor 6 can be mounted conveniently and positioned accurately on the base 5 with the tongues 721 of the rack 71 engaging the top portions of the guide rods 8 and sliding downwardly along the guide rods 8 until the tongues 721 engage the grooves 524 and the lower ring 72 is seated on the shoulder face 521. A chain 62 is connected to the submersible motor 6 for installation of the latter on the base 5.

Figure 8:
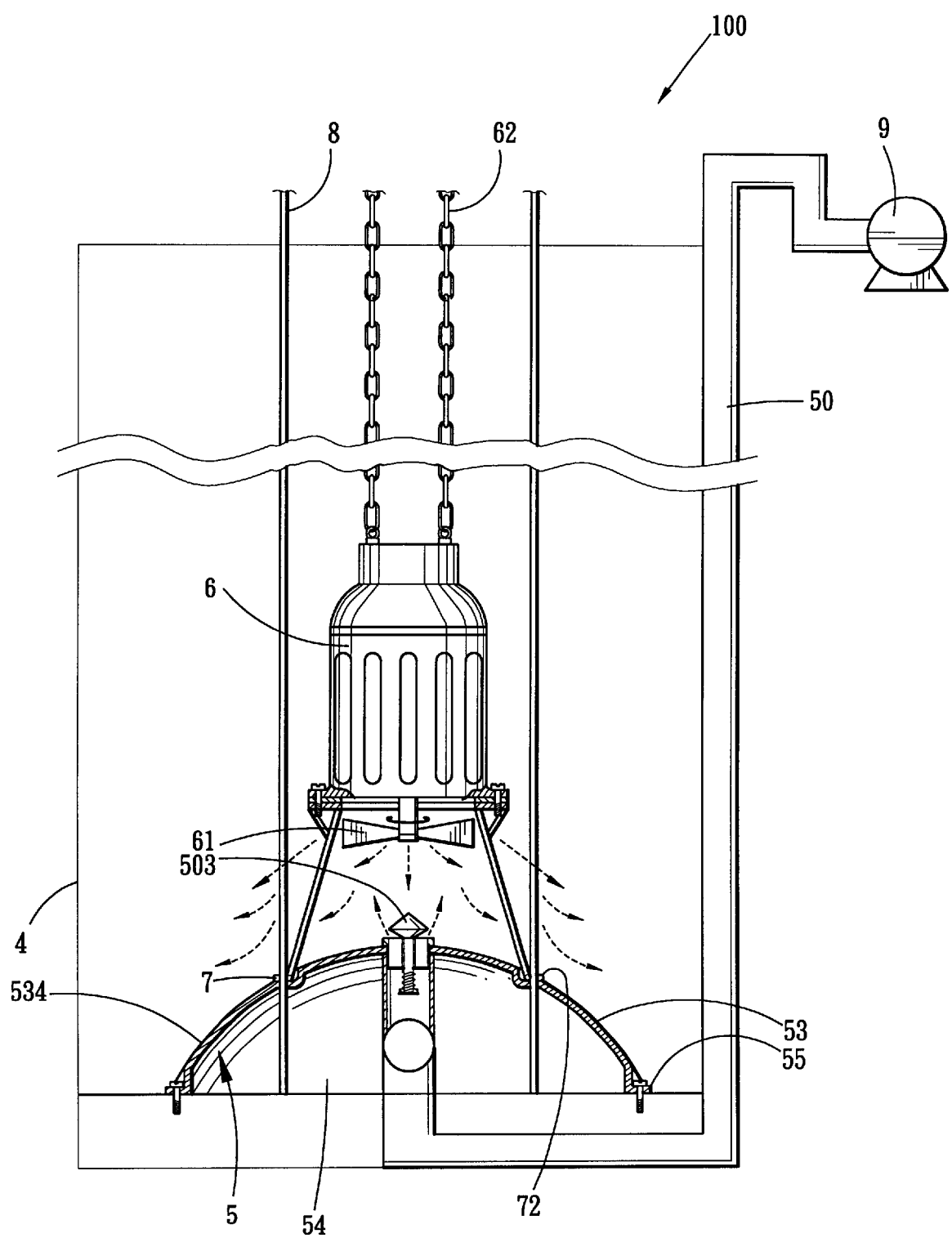
FIG. 8 is a partly cross-sectional schematic side view of the aerating unit of FIG. 4 in an actuated state.

Referring now to FIG. 8 in combination with FIGS. 4 to 7, air flow is supplied by the air blower 9, and is directed by the air conduit 50 to pass through the air outlet 501 to form larger air bubbles that are directed toward the propeller 61, which breaks the larger air bubbles into finer air bubbles and directs the finer air bubbles toward the curved surface 534 of the base 5 when the aerating unit 100 is actuated. The curved surface 534 of the base 5 deflects the finer air bubbles directed from the propeller 61 in radial directions thereof, thereby enhancing the dispersion of the air bubbles in the body of waste water since the air bubbles are dispersed in a much wider region in the body of waste water than that in a conventional aerating unit.

The arrangement of the guide rods 8 and the rack 7 facilitates the maintenance of the submersible motor 6, which can be easily disassembled from the base 5 by sliding the motor 6 upward along the guide rods 8.

With the invention thus explained, it is apparent that various modifications and variations can be made without departing from the spirit of the present invention. It is therefore intended that the invention be limited only as recited in the appended claims.

I claim:

1. An aerating unit adapted to treat a body of waste water, comprising:

a container adapted for storing the body of waste water;

a submersible motor disposed in said container and having a shaft extending downwardly and outwardly therefrom into the body of waste water, said shaft having a bottom free end provided with a propeller;

an air conduit adapted to be connected to an air supply at one end, and extending into said container at the other end which defines an air outlet that is disposed adjacent to and that faces toward said propeller, said air conduit being adapted to introduce air into the body of waste water stored in said container, thereby generating larger air bubbles inside said container that are directed toward said propeller, said motor being operable so as to enable said propeller to break the larger air bubbles into finer air bubbles that are directed downwardly; and a base disposed below and aligned vertically with said motor in said container, said base having a curved surface which is convex in a direction towards said propeller for deflecting the finer air bubbles directed from said propeller in radial directions of said curved surface in the body of waste water;

wherein said base includes a shell body which defines said curved surface on a convex side adjacent to said propeller, said shell body having an apex aligned with said shaft, a bottom peripheral end radially offset from said apex, an intermediate region extending circumferentially and downwardly from said apex to said bottom peripheral end, and a bottom end flange extending radially and outwardly from said bottom peripheral end and mounted securely on a bottom of said container, said shell body and said bottom of said container confining a chamber therebetween.

2. The aerating unit of claim 1, wherein said apex of said base further has a top opening aligned with said shaft, said air conduit extending into said chamber and further extending outwardly of said chamber through said top opening in said shell body on the other end which defines said air outlet, said air conduit having a check valve mounted therein adjacent to said outlet for closing said air outlet when air flow supplied by said air supply is stopped.

3. The aerating unit of claim 1, further comprising a supporting rack having an annular upper plate that defines an opening, a lower ring disposed below and aligned with said upper plate and having a plurality of angularly spaced apart tongues projecting inwardly thereof, and a plurality of legs interconnecting said upper plate and said tongues of said lower ring, said intermediate region of said shell body having a plain annular shoulder face formed thereon, and a plurality of grooves extending inwardly thereof from said shoulder face, said lower ring being seated on said shoulder with said tongues engaging said grooves, said motor being seated and fastened on said upper plate with said shaft extending through said opening in said upper plate.

4. The aerating unit of claim 3, wherein said shoulder face is formed with a plurality of through-holes disposed respectively within said grooves, said aerating unit further comprising a plurality of elongated guide rods mounted securely on said bottom of said container within said chamber and extending upwardly therefrom through said through-holes in said shoulder face, said guide rods having top portions extending upwardly through surface of the body of waste water.

* * * * *